United States Patent [19]

Hiroi

[11] Patent Number: 5,544,039
[45] Date of Patent: Aug. 6, 1996

[54] PROCESS CONTROL SYSTEM

[75] Inventor: Kazuo Hiroi, Tokyo, Japan

[73] Assignee: Kabushiki Kaisha Toshiba, Kawasaki, Japan

[21] Appl. No.: 253,219

[22] Filed: Jun. 2, 1994

Related U.S. Application Data

[63] Continuation of Ser. No. 897,072, Jun. 11, 1992, abandoned.

[30]   Foreign Application Priority Data

Jun. 11, 1991 [JP] Japan .................................. 3-138817
Jul. 29, 1991 [JP] Japan .................................. 3-188809

[51] Int. Cl.$^6$ ........................................ G05B 13/04
[52] U.S. Cl. ........................ 364/151; 364/161; 364/157
[58] Field of Search ........................... 364/150, 151, 364/157, 158, 176, 177, 149, 153, 161, 162, 163

[56]   References Cited

U.S. PATENT DOCUMENTS

| | | | |
|---|---|---|---|
| 4,054,780 | 10/1977 | Bartley et al. | 364/150 |
| 4,861,960 | 2/1989 | Haefner et al. | 219/110 |
| 5,121,332 | 6/1992 | Balakrishnan et al. | 364/177 X |
| 5,166,873 | 11/1992 | Takatsu et al. | 364/151 |
| 5,406,474 | 4/1995 | Hansen | 364/148 |

*Primary Examiner*—Roy N. Envall, Jr.
*Assistant Examiner*—Brian C. Oakes
*Attorney, Agent, or Firm*—Oblon, Spivak, McClelland, Maier & Neustadt, P.C.

[57]   ABSTRACT

A system for controlling a process system with a process system gain and dead time of which its transfer function includes a gain term element corresponding to the process system gain and a dead time term element corresponding to the dead time, subject to an external disturbance, by adjusting a control variable output by the process system to a target value according to a manipulated variable output by a controller performing at least proportional and integral control operations based on a deviation between the control variable and the target value. The system includes dead time compensation unit, connected to the controller, including a system model unit having a system transfer function approximative to the transfer function of the process system and a model unit having a model transfer function resulting from eliminating the dead time term element from the system transfer function, for outputting a compensation output signal to compensate the dead time, and gain adjustment unit, connected to the dead time compensation means, for adjusting a gain of the system model unit to the process system gain according to the variation in the process system gain of the process system.

8 Claims, 4 Drawing Sheets

PROCESS CONTROL SYSTEM

This application is a continuation of application Ser. No. 07/897,072, filed on Jun. 11, 1992, now abandoned.

BACKGROUND OF THE INVENTION

1. Field of the Invention

This invention relates to a process control system, and more particularly to a process control system using an improved Smith's method for dead time compensation.

2. Discussion of the Background

Control units processing PI or PID adjustment functions have been widely used in all industrial fields throughout the history of process control, and are still indispensable to plant operation.

When a process system is approximated by the dead time L and first order lag T (a time constant), the process system can be simply controlled by PID control in the case of first order lag alone. However, when dead time L is included, as dead time L becomes greater, in other words as L/T becomes greater, control by PID control alone gradually becomes more difficult.

Therefore, as a method for improving the controllability of a process system which includes dead time, O. J. M. Smith (personal name) proposed the so-called 'Smith method' or 'dead time Smith compensation method' which is now widely used. This is designed to control the apparent first order lag process system alone by adding a dead time compensator, which uses a process system model, to PID control and shifting dead time outside the control loop.

FIG. 1(a) shows a function block diagram of a control unit which uses such a dead time Smith compensation method. In this unit, dead time compensator 5 is newly added to a control system. Deviation computing device 1 obtains the deviation En, between target value SVn and controlled variable PVn. PID adjustment device 3 performs PI or PID control operation based on this deviation En, and impresses manipulating signal MVn obtained on process system 2.

In dead time compensator 5, first order lag model device 6 outputs manipulating variable MVn of PID adjustment device 3 through a first order lag transfer function. Process system model device (also called process system model') 7 outputs the same manipulating signal MVn of PID adjustment device 3 through a transfer function with first order lag and dead time. Subtraction device 8 subtracts the output of process system model 7 from the output of first order lag model device 6.

The construction is such that the output of subtraction device 8 is conducted to subtraction device 4, which is provided on the output side of deviation computing device 1, where the output of dead time compensator 5 is subtracted from deviation En.

Here, in FIG. 1(a),

Gp·e–Lp·s: Transfer function of the process system

Gp–Kp/(1+Tp·s): Transfer function of process system with dead time eliminated

Lp: Process system dead time

Kp: Process system gain

Tp: Process system time constant s: Laplace operator also,

Gm·e–Lms: Process system mode transfer function

Gm=Km/(1+Tm·s): Transfer function of process system model with dead time eliminated Lm: Process system model dead time Km: Process system model gain Tm: Process system model time constant, and when FIG. 1(a) is rearranged by equivalent conversion, it becomes as in FIG. 1(b).

Here, disturbance D is small and can be ignored. Also, if the condition of agreement of the process system characteristic and the characteristic of process system model 7 is assumed, that is to say that there is the relationship $$\text{Disturbance=small, } T_p = T_m, L_p = L_m \qquad (1)$$

we have Gp=Gm, when the transfer constant for Svn–PVn in this case is found, it becomes $$PVn/SVn = \{(Gc \cdot Gm)/(1 + Gc \cdot Gm)\} E-Lp \cdot s \qquad (2)$$

and it can be converted to the type of construction in FIG. 1(c). Therefore, this means that, in this control unit, first order lag model device 6 with the dead time eliminated may be feed-back controlled by PID adjustment device 3. In other words, since dead time can be removed from the control loop, this unit can easily be controlled by PID adjustement device 3, and good controllability can be expected. Dead time element 9 is placed outside the control loop.

However, as is evident from the above explanation, control units using the above type of dead time Smith compensation method cannot be constructed as shown in FIG. 1(c) unless the conditions of Equation (1) are established.

Nevertheless, it is difficult always to establish the conditions in Equation (1) in actual plant control. For example, the conditions in Equation (1) may be altered in the course of time by variations in the characteristics of the process system and environmental changes, such as ambient temperature, catalyst temperature, raw material conditions or size of load. As a result, the more the conditions in Equation (1) vary, the more the controllability deteriorates. Thus, there is the problem of becoming unable to achieve the functions of the dead time Smith compensation method, resulting in a great influence on the controllability of the plant.

SUMMARY OF THE INVENTION

It is an object of the invention to control a process control system with a dead time compensation control unit. Another object is to make it possible to control a process control system, subject to changes in its process system gain characteristic, with an improved dead time compensation control unit.

The foregoing objects are achieved according to the present invention by providing a system for controlling a process system with a process system gain and dead time of which its transfer function includes a gain term element corresponding to the process system gain and a dead time term element corresponding to the dead time, subject to an external disturbance, by adjusting a controlled variable output by the process system to a target value according to a manipulated variable output by a controller performing at least proportional and integral control operations based on a deviation between the controlled variable and the target value. The system includes dead time compensation means, connected to the controller, including a system model unit having a system transfer function approximative to the transfer function of the process system and a model unit having a model transfer function resulting from eliminating the dead time term element from the system transfer function, for outputting a compensation signal to compensate the dead time, and gain adjustment means, connected to the dead time compensation means, for adjusting a gain of the system model unit to the process system gain of the process system according to the variation in the process system gain of the process system.

According to another aspect of the present invention, the above objects are achieved by providing a method of controlling a process system with a process system gain and dead time of which its transfer function including a gain term element corresponding to the process system gain and a dead time term element corresponding to the dead time, subject to an external disturbance, by adjusting a controlled variable output by the process system to a target value according to a manipulated variable output by a controller performing at least proportional and integral control operations based on a deviation between the control variable and the target value. The method comprising the steps of: compensating the dead time by using dead time compensation means, connected to the controller, including a system model unit having a system transfer function approximative to the transfer function of the process system and a model unit having a model transfer function resulting from eliminating the dead time term element from the system transfer function; and adjusting a gain of the system model unit to the process system gain of the process system according to the variation in the process system gain of the process system.

DETAILED DESCRIPTION OF THE PREFERRED EMBODIMENTS

An embodiment of this invention is described below with reference to FIG. 2. Incidentally, detailed descriptions of those functions or parts in FIG. 2 which are given the same symbols as in FIG. 1 are omitted.

Figure 2:
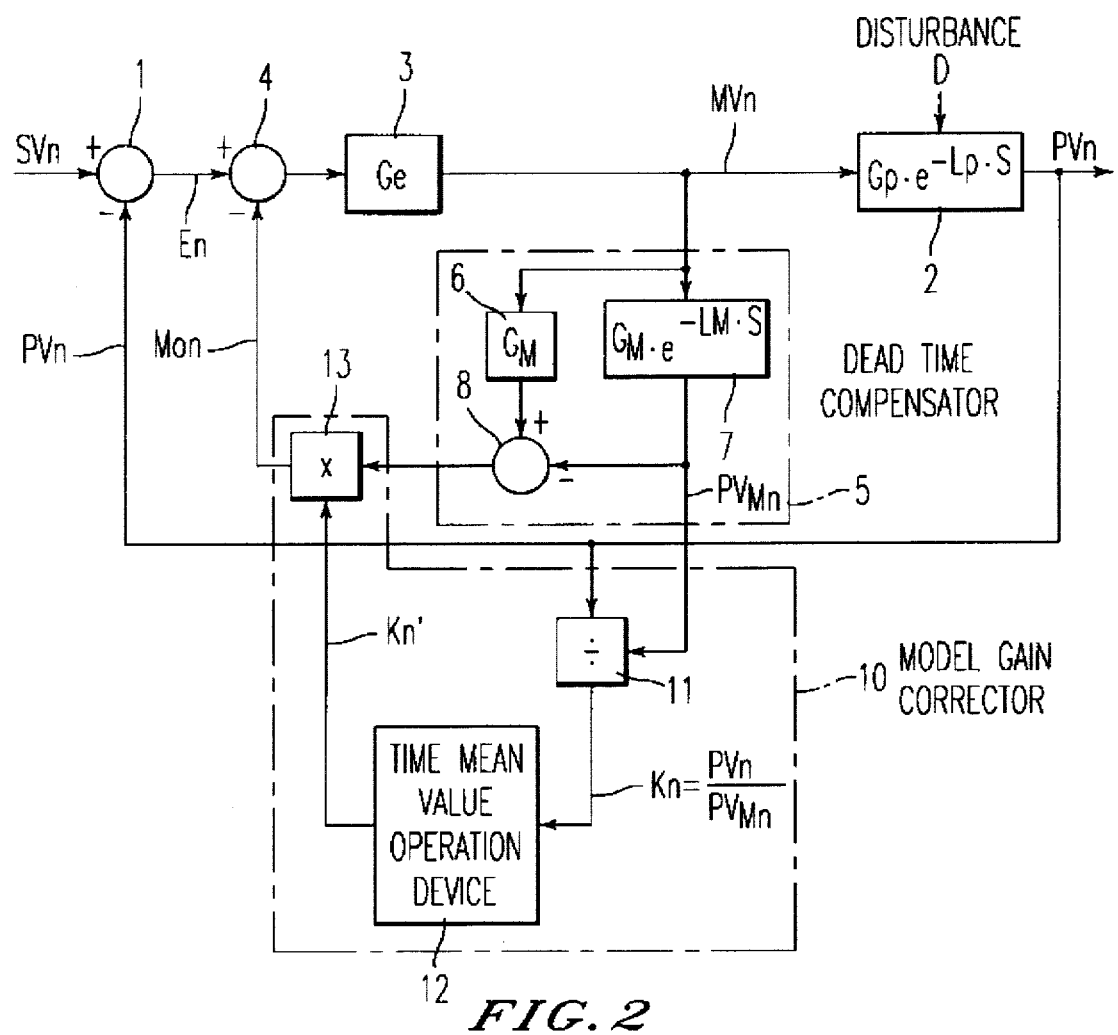
FIG. 2 is a block diagram showing a process control system using a Smith's method for dead time compensation according to the invention.

In FIG. 2, model gain corrector 10, which automatically corrects the gain of dead time compensator 5 in response to the variation of the process system gain of process system 2, is provided for dead time compensator 5.

In model gain corrector 10, division device 11 receives controlled variable PVn from process system 2 and output signal PVmn of process system model 7 which composes part of dead time compensator 5, and calculates their ratio Kn=PVn/PVmn. Time mean value operation device 12 calculates the mean ratio Kn' (hereinafter, mean values are shown by the simple addition of ') by calculating the time mean value of output Kn, of division device 11. Multiplication device 13 automatically corrects the output of dead time compensator 5 by multiplying the output of dead time compensator 5 by this mean ratio Kn'.

Therefore, in model gain corrector 10, controlled variable PVn from process system 2 and output signal PVmn of process system model 7, which composes a part of dead time compensator 5, are conducted to division device 11. Here, after finding ratio Kn' by executing the operation PVn/PVmn, it is transferred to the succeeding time mean value operation device 12. In time mean value operation device 12, mean ratio Kn' is found by executing a time mean value operation on original ratio Kn from division device 11, and is conducted to multiplication device 13. Here, the output signal of dead time compensator 5 is automatically changed by multiplying the output of dead time compensator 5 by mean ratio Kn'.

Next, the correction of the process system model gain for variation of the process system gain is described. Here, if the characteristics of process system 2 and process system model 7 are in agreement, controlled variable PVn, and output signal PVmn of process system model 7 should also be in agreement. Here, if ratio Kn=PVn/PVmn, then Kn=1. However, in practice, Kn=1 due to variations in the characteristics of process system 2. Therefore, in this unit, the variation of the process system gain, ratio Kn, is detected and the variation of the process system model gain is corrected according to this ratio Kn.

Here, controlled variable PVn and output signal PVmn of process system model 7 for manipulating signal MVn can be expressed as $$PVn = MVn \cdot \{Kp/(1+Tp \cdot s)\} \cdot e^{-Lp \cdot s} \qquad (3)$$

$$PVmn = MVn \cdot \{Km/(1+Tm \cdot s)\} \cdot e^{-Lp \cdot s} \qquad (4)$$

Here, ratio Kn which is the output of division device 11 is $$Kn = Kn = PVn/PVmn \qquad (5)$$

Thus, if Equation (3) and (4) are substituted in Equation (5), we have $$Kn = (Kp/Km) \cdot \{(1+Tm \cdot s)/(1+T \cdot s)\} \cdot e^{-(Lp-LM) \cdot s} \qquad (6)$$

Here, taking Tm=Tp, Lm=Lp, Equation (6) can be obtained as $$Kn = \frac{Kp}{km}$$

Moreover, in order to eliminate the influence of momentary fluctuations of ratio Kn, ratio Kn is conducted to time mean value operation device 12. Here, if the time mean value for a specified time is taken, and its output is taken as Kn', $$Kn' = (Kp'/Km') \qquad (8)$$

Therefore, if this mean ratio Kn' is conducted to multiplication device 13 and is multiplied to the output of dead time compensator 5, output Mon of multiplication device 13 is $$Mon = Kn' \times \text{output of dead time compensator 5} \qquad (9)$$

$$= \frac{Kp'}{Km'} \times \frac{Km}{1+Tm \cdot s} \times (1 - e^{-LM \cdot s}) \times MVn$$

Which here, since $Km' = Km$, can be obtained as $$= Kp' \times \frac{1}{1 + Tm \cdot s} \times (1 - e - LM \cdot s) \times MVn$$

In other words, as is evident from Equation (9), by the addition of model gain corrector 10 on the output side of dead time compensator 5, the gain of process system model 7 of dead time compensator 5 is always automatically corrected to Kp, the gain of process system 2.

Therefore, when applying the above type of embodiment composition, it is always possible to make characteristics of the process system that of the process system model agree by automatically correcting the gain of process system model 7 according to the variation of the process system gain. Thus, the controllability is increased by fully applying the dead time Smith compensation method, even for characteristics variation and environmental changes of the process system. Moreover, it is also possible to obtain the gain ratio for correction by dividing the controlled variable from process system 2 by the output of process system model 7. Thus, the gain of process system model 7 can be corrected with a very simple construction.

Furthermore, the process system model gain can be accurately corrected without undergoing the influence of momentary fluctuations of the ratio by making the ratio, obtained by dividing the controlled variable from process system 2 by output signal from process system model 7, the time mean value for a specified time using time mean value operation device 12.

In particular, in an actual plant, the characteristics of the process system varies greatly and frequently. However, the gain of process system model 7 can be automatically corrected according to the variations in the process system gain. Thus, even in a control system with dead time, it can greatly contribute to the improvement of controllability.

Incidentally, in the above embodiment, the ratio Kn obtained by division device 11 obtained the time mean value of a specified time in time mean value operation device 12. However, even if time mean value operation device 12 is omitted, an approximate effect can be obtained. Apart from this, this invention may be applied with various modifications provided they do not deviate from its purport.

Figure 1A:
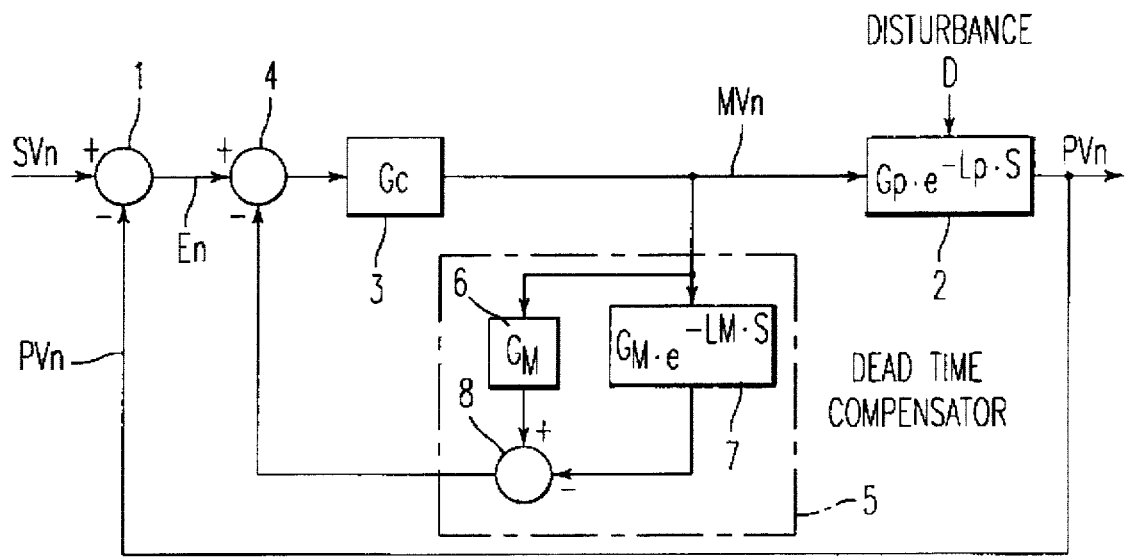
FIGS. 1(a), 1(b) and 1(c) are block diagrams showing a conventional process control system capable of compensating dead time.
Figure 1B:
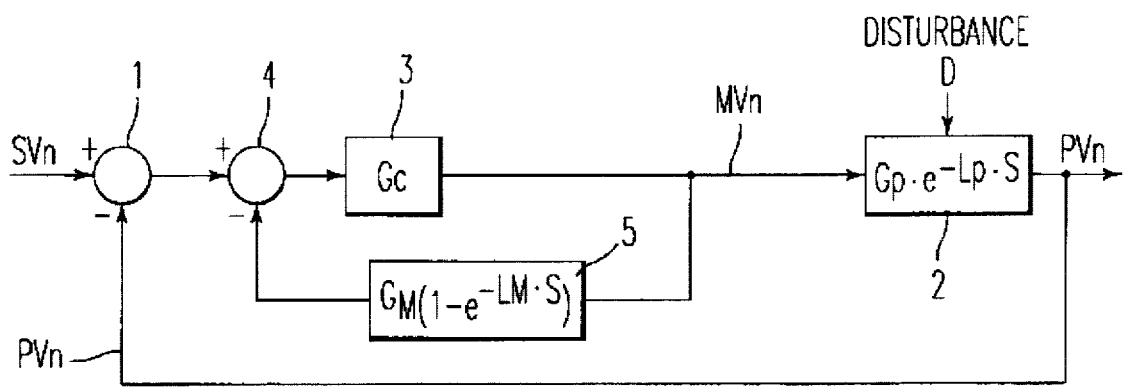
Figure 1C:
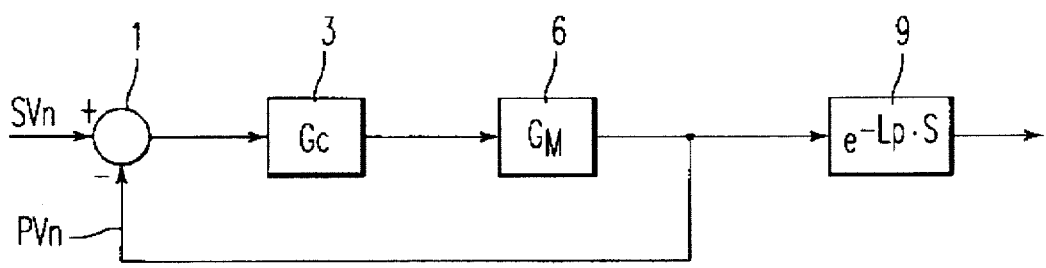

Another embodiment of this invention is described below with reference to FIG. 3. Incidentally, detailed descriptions of those functions or parts in FIG. 3 which have been given the same symbols as in FIGS. 1(a) to (C) are omitted.

Figure 3:
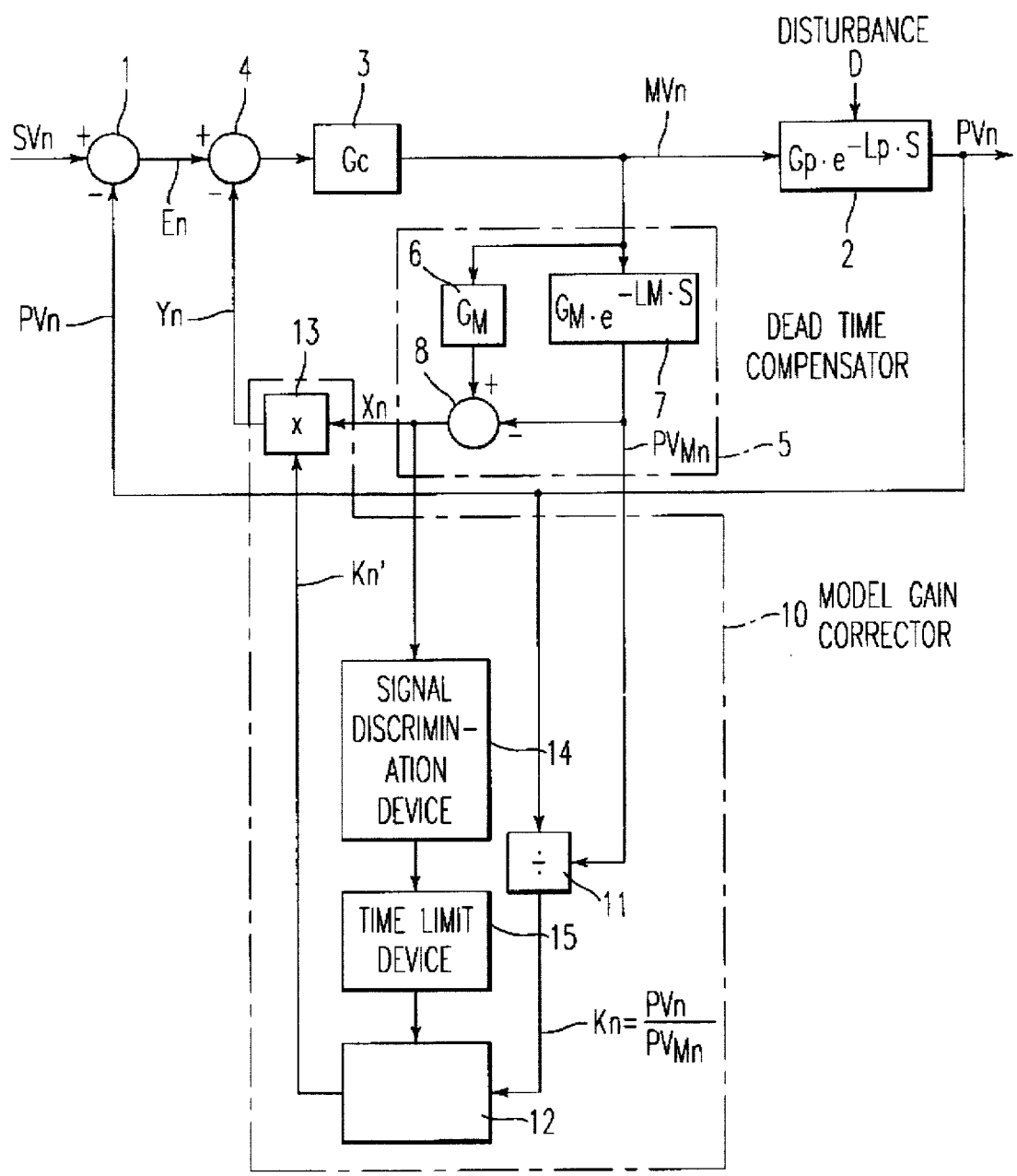
FIG. 3 is a block diagram showing another process control system using a Smith's method for dead time compensation according to the invention.

In FIG. 3, model gain corrector 10 automatically corrects the gain of dead time compensator 5 in response to the variation of the gain of process system 2, in dead time compensator 5 which applies the Smith method.

Model gain corrector 10 is provided with division device 11, which receives controlled variable PVn from process system 2 and output signal PVmn of process system model 7 which composes part of dead time compensator 5, and calculates their ratio Kn=PVn/PVmn. Gain ratio signal Kn calculated is stored in memory device 12. Multiplication device 1 corrects the gain of process system model 7 in response to the gain variation of process system 2. Here, the gain ratio signal read out from memory device 12 is multiplied by the output of dead time compensator 5. The design is that the signal obtained after gain correction is supplied to subtraction device 4.

Also, model gain corrector 10 has signal discrimination device 14 which discriminates zero signals outputted from dead time compensator 5 and outputs a zero discrimination signal. The zero discrimination signal obtained here is conducted to time limit device 15. Time limit device 15 has a timing function. When the zero discrimination single output to of dead time compensator 5, is continued for more than a specified time Tn, it executes updating of gain ratio signal Kn, by supplying an update command signal to memory device 12. At times other than this, it has the function of stopping memory update and correcting the gain of process system model 7 while maintaining the immediately preceding gain ratio signal Kn.

Next, the circumstances in which the construction shown in FIG. 3 came to be adopted and also the results of experiment and study are explained. Now, if the time required for complete response of process system 2 is taken as TR, this complete response required time TR can be expressed as $$TR = \text{approximate dead time } Lp + (3-5) \cdot Tp$$

Figure 4:
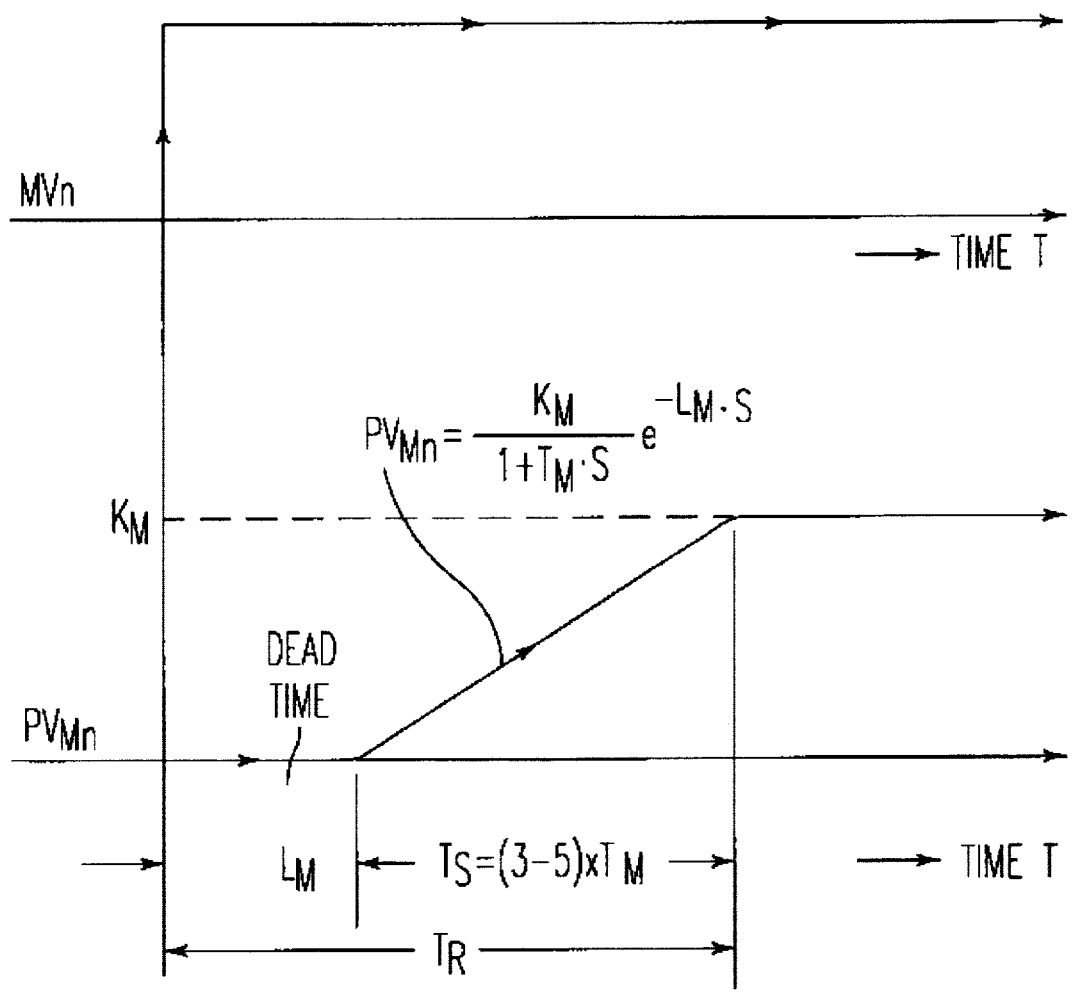
FIG. 4 is a diagram illustrating operations of the process control system shown in FIG. 3.

Here, if the characteristics of the process system and the characteristics of the process system model are in agreement, controlled variable PVn and output PVmn of process system model 7 will agree when complete response required time TR of the above equation is exceeded after variation of controlled variable PVn, as shown in FIG. 4. Therefore, gain ratio Kn at this time should be $$Kn = PVn/PVmn = 1$$

However, in practice, sometimes Kn=1 is not true. This is because the gain of the process system characteristics varied due to chracteristic variations of process system 2 and environmental conditions such as ambient temperature, catalyst density, material conditions and size of load, and so the gains of the process system characteristics and the process system model are not in agreement. Therefore, if the gain of the process system model is made to agree with the gain of the process system characteristics by calculating gain ratio Kn, the conditions of the Smith method will be satisfied.

Therefore, timing of complete response required time TR is required. However, since the dead time is already eliminated by dead time compensator 5, the remaining time Ts of complete response required time TR from which dead time Lm has been eliminated, that is to say $$Ts = (3-5) \cdot Tm$$

is timed as the approximate complete response required time. If the gain ratio Kn obtained after this time Ts has elapsed is used, it becomes a value which appropriately reflects the gain variation of the process system. Moreover, if gain compensation of the process system model is executed by using this gain ratio Kn, the conditions of the Smith method can be satisfied.

Correction of the process system model gain for variations of the process system gain is explained below with some equations.

First, controlled variable PVn for manipulating signal MVn supplied from PID adjustment device 3 and output PVmn of process system model 7 can be expressed by $$\begin{aligned} PVn &= MVn \cdot Gp \cdot e - Lp \cdot s \\ &= MVn \cdot \{Kp/(1 + Tp \cdot s)\} \cdot e - Lp \cdot s \end{aligned} \quad (10)$$

$$\begin{aligned} PVmn &= MVn \cdot Gm \cdot e - Lp \cdot n \\ &= MVn \cdot \{Km/(1 + Tm \cdot s)\} \cdot e - Lp \cdot s \end{aligned} \quad (11)$$

At the same time, gain ratio signal, Kn which is the output of division 11, is $$Kn = PVn/PVmn \quad (12)$$

and if Equations (10) and (11) are substituted in Equation (12), the following Equation (13) can be obtained.

$$Kn = (kp/Km) \cdot \{(1+Tm \cdot s)/(1+Tp \cdot s)\} \cdot e^{-(Lp-LM) \cdot s} \quad (13)$$

Here, when the output of dead time compensator 5 becomes zero and a zero signal is discriminated by signal discrimination device 14 and an update command signal is outputted from time limit device 15, since complete response required time $T_R$ is exceeded after variation of manipulating signal MVn, in Equation (13).

$$(1+Tm \cdot s)/(1+Tp \cdot s) = 1 - e^{-(Lp-LM) \cdot s} = 1$$

Therefore, in the end, Equation (13) becomes $$Kn = (kp/Km) \quad (14)$$

Therefore, the gain ratio signal obtained by this Equation is conducted to gain correction device 13 and is multiplied by output signal Xn of dead time compensator 5. By this means an output Yn, such as in the following Equations, is obtained from gain correction device 13.

$$\begin{aligned}
Yn &= Kn/Xn \quad (15)\\
&= (Kp/Km) \cdot \{Km/(1+Tm \cdot s)\} \cdot \\
&\quad (1-e^{-LM \cdot s}) \cdot MVn \\
&= \{Kp/(1+Tm \cdot s)\} \cdot (1-e^{-LM \cdot s}) \cdot MVn \quad (16)
\end{aligned}$$

Thus, as is evident from Equation 16, this shows that if gain ratio signal Kn of model gain corrector 10 is multiplied by output Xn of dead time compensator 5, process system model gain Km of dead time compensator 5 is always automatically corrected by process system gain Kp.

Therefore, generally, when the Smith dead time compensation method is adopted for a process system which contains dead time, it is the case that disturbance is small and also that the process system characteristics and the process system model are in agreement. However, in most cases, the gain of the process system characteristics varies due to characteristic variations of process system 2 and the environmental conditions. Therefore, the gains of the process system and the process system model do not agree, and there is a great influence on controllability.

Thus, this unit finds the gain ratio signal from the controlled variable and the output of the process system model and, at the same time, stores the gain ratio at a time equivalent to the complete response time after variation of the manipulated signal. The design is such that the process system model gain can be corrected using this stored gain ratio signal. Thus, the process system model gain of dead time compensator 5 is corrected based on the varied gain of the process system. Therefore, the functions of the Smith dead time compensation method can be fully exhibited, and a dead time compensation control unit with efficient controllability can be achieved.

In particular, in an actual plant, the gain of the process system varies greatly and frequently. However, adaptability to an actual plant is markedly improved by automatic correction of the process system model gain. If this is applied to control units scattered in various places about the plant, this will contribute greatly to the improvement of the controllability of the whole plant. Moreover, full-scale flexibility and super-automation of plant operation can be achieved and high-quality products can be manufactured.

Incidentally, this invention is not limited to the above embodiment. In other words, in the above embodiment, the design is to transmit the output of division device 11 to multiplication device 13 as it stands after it has been stored in memory device 12. However, it may have a construction which provides a smoothing device for eliminating momentary fluctuations of ratio Kn on the output side of, for instance ratio operation device 11 or memory device 12. Also, updating may be executed using output zero of dead time compensator 5 by eliminating timing device 15 or using, for instance, $T = (3-5) \cdot Tm$ out of the timing set values of timing device 15. In the latter case, the region due to time constant Tm can be simply ignored and it can be applied to the gain variation using an approximation.

Apart from this, this invention may be applied with various modifications provided they do not deviate from its purport.

When using this invention as described above, it is possible to provide a dead time compensation control unit which can fully exhibit the functions of the dead time Smith compensation method. Even when variations in the gain of the process system due to characteristics changes in the process system and changes in its environment, it is also possible to execute control with efficient controllability, even in a control system with dead time.

What is claimed is:

1. A system for controlling a process system with a process system gain and dead time of which its transfer function includes a gain term element corresponding to the process system gain and a dead time term element corresponding to the dead time, subject to an external disturbance, by adjusting a controlled variable output by the process system to a target value according to a manipulated variable output by a controller performing at least proportional and integral control operations based on a deviation between the controlled variable and the target value, the system comprising:

dead time compensation means, connected to the controller, including:
  a system model having a system transfer function approximative to the transfer function of the process system, and
  a model unit, connected in parallel with the system model unit, having a model transfer function resulting from eliminating the dead time element from the system transfer function,
  wherein the dead time compensation means outputs a compensation signal to compensate the dead time; and gain adjustment means, connected to the dead time compensation means, including:
  a first input for receiving an output signal of the system model unit and a second input for receiving the controlled variable,
  a divider dividing the controlled variable by the output of the system model unit to generate a first gain ratio,
  a multiplier multiplying the compensation signal output by the dead time compensation means by a final gain ratio based on the first gain ratio, to adjust a gain of the system model unit to the process system gain of the process system according to the variation in the gain of the process system, and
  a memory means for storing the first gain ratio, and update means for updating the first gain ratio when the compensation signal output by the dead time compensation means is a zero signal for more than a predetermined time.

2. The system of claim 1, wherein the compensation signal is generated by subtracting the signal output of the system model unit from the signal output of the model unit.

3. The system of claim 2, wherein the gain adjustment means further comprises time mean value operation means for operating a time mean value of the first gain ratio to generate the final gain ratio.

4. The system of claim 1, wherein the update means includes a signal discrimination means for generating a discrimination signal when the compensation signal output by the dead time compensation means is the zero signal, and time limit means for updating the gain ratio stored in the memory means when the discrimination signal continues to be generated for more than the predetermined time.

5. A method for controlling a process system with a process system gain and dead time of which its transfer function includes a gain term element corresponding to the process system gain and a dead time term element corresponding to the dead time, subject to an external disturbance, by adjusting a controlled variable output by the process system to a target value according to a manipulated variable output by a controller performing at least proportional and integral control operations based on a deviation between the controlled variable and the target value, the system comprising the steps of:

compensating the dead time by using dead time compensation means, connected to the controller, including a system model unit having a system transfer function approximative to the transfer function of the process system and a model unit, connected in parallel with the system model unit, having a model transfer function resulting from eliminating the dead time term element from the system transfer function, for outputting a compensation signal;

adjusting a gain of the system model unit to the process system gain of the process system according to the variation in the process system gain of the process system by dividing the controlled variable by the output of the system model unit to generate a first gain ratio, and further multiplying the compensation signal by a final gain ratio based on the first gain ratio; and wherein the step of adjusting the gain ratio includes the step of storing the first gain ratio, and the step of updating the first gain ratio when a compensation signal output by the dead time compensation means is a zero signal for more than a predetermined time.

6. The method of claim 5, wherein the compensation signal is generated by subtracting the signal output of the system model unit from the signal output of the model unit.

7. The method of claim 6, wherein the step of adjusting the gain ratio includes the step of operating a time mean value of the first gain ratio to generate the final gain ratio.

8. The method of claim 5, wherein the step of updating the first gain ratio includes the step of generating a discrimination signal when the compensation signal output by the dead time compensation means is the zero signal, and the step of updating the first gain ratio stored in the memory means when the discrimination signal continues to be generated for more than the predetermined time.

* * * * *